United States Patent
Maki et al.

(10) Patent No.: US 11,472,986 B2
(45) Date of Patent: *Oct. 18, 2022

(54) PUNCTURE SEALING AGENT AND PUNCTURE REPAIR SYSTEM

(71) Applicant: SUMITOMO RUBBER INDUSTRIES, LTD., Kobe (JP)

(72) Inventors: Takashi Maki, Kobe (JP); Michael M. Koegler, Hanau (DE); Angel J. Jimenez, Hanau (DE); Arnold Eckhardt, Hanau (DE)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 472 days.

This patent is subject to a terminal disclaimer.

(21) Appl. No.: 16/534,166

(22) Filed: Aug. 7, 2019

(65) Prior Publication Data
US 2020/0063003 A1    Feb. 27, 2020

(30) Foreign Application Priority Data

Aug. 22, 2018 (EP) ..................................... 18190297
Jul. 10, 2019 (JP) ............................. JP2019-128487

(51) Int. Cl.
*C09J 107/02* (2006.01)
*B29C 73/16* (2006.01)
*C09J 11/06* (2006.01)

(52) U.S. Cl.
CPC ........... *C09J 107/02* (2013.01); *B29C 73/163* (2013.01); *C09J 11/06* (2013.01)

(58) Field of Classification Search
CPC ........ C09J 11/06; C09J 107/02; B29C 73/163
See application file for complete search history.

(56) References Cited

U.S. PATENT DOCUMENTS

| | | | |
|---|---|---|---|
| 10,836,126 B2 * | 11/2020 | Jimenez | ................ C09J 103/02 |
| 2015/0175862 A1 | 6/2015 | Ichikawa | |
| 2016/0185052 A1 * | 6/2016 | Okamatsu | ................ C08L 7/00 |
| | | | 523/166 |
| 2017/0066206 A1 | 3/2017 | Takahara | |
| 2017/0165929 A1 | 6/2017 | Okamatsu et al. | |
| 2017/0203525 A1 * | 7/2017 | Okamatsu | ................ C08L 3/12 |

FOREIGN PATENT DOCUMENTS

| | | |
|---|---|---|
| JP | 2015-98538 A | 5/2015 |
| WO | WO 2017/075673 A1 | 5/2017 |

* cited by examiner

*Primary Examiner* — Edward J Cain
(74) *Attorney, Agent, or Firm* — Birch, Stewart, Kolasch & Birch, LLP

(57) ABSTRACT

A puncture sealing agent is disclosed which comprises natural rubber latex, an aqueous solution of an adhesive and an antifreezing agent. The adhesive is a carbohydrate and the puncture sealing agent comprises a solid content resulting from the natural rubber latex in an amount of 21 wt % or less, based on the total weight of the puncture sealing agent.

15 Claims, No Drawings

PUNCTURE SEALING AGENT AND PUNCTURE REPAIR SYSTEM

TECHNICAL FIELD

The present invention is related to a puncture sealing agent having an excellent sealing performance for use in a puncture repair system.

BACKGROUND ART

In tire puncture repair systems a puncture sealing agent is used for sealing punctures in pneumatic tires. The puncture sealing agent is a liquid comprising a solid dispersion and is injected into a damaged tire. The tire is then filled with air with the aid of a compressor and can be used to travel in that condition. When traveling, the puncture sealing agent is shaken within the tire, and as a result, the solid content of the dispersion is deposited to cover the puncture hole.

In recent years the required level of performance for puncture sealing agents has increased. Most of the efforts have been put into improving the sealant performance, injectability, and/or the injectability in low-temperature environments while maintaining ideal storage performance.

Puncture sealing agents contain usually synthetic components for improving the sealing performance, injectability and/or the injectability in low-temperature environments while maintaining ideal storage performance. However, using synthetic components is not resource saving and environmentally friendly. In addition, there is room for improving the sealing properties of puncture sealing agents having sufficient low temperature injectabilities.

A puncture sealant agent is described in Patent Literature 1, wherein natural rubber is contained in an amount such that the solid content derived from natural rubber is 25 wt %, based on the total weight of the puncture sealant agent together with a rosin resin having a softening point of 90° C. and propane-1,3-diol. In Patent Literature 2, a further puncture sealing agent is described which contains a rubber latex, propane-1,3-diol and a resin emulsion as tackifier, such as a terpene resin. However, there remains room for improvement with regard to low temperature injectability and seal retention performance.

CITATION LIST

Patent Literature

Patent Literature 1: JP 2015-98538 A
Patent Literature 2: US 2015/0175862 A1

SUMMARY OF INVENTION

Technical Problem

In view of the above, the object underlying the present invention is to provide a puncture sealing agent, which is resource saving, environmentally friendly and has a sealing performance, injectability, and injectability in low-temperature environments comparable to conventionally used puncture sealing agents based on synthetic components.

Solution to Problem

In accordance with the present invention, this object is solved by a puncture sealing agent according to claim 1.

The puncture sealing agent according to the present invention comprises natural rubber latex, an aqueous solution of an adhesive and an antifreezing agent. The adhesive is a carbohydrate and the puncture sealing agent comprises a solid content resulting from the natural rubber latex in an amount of 21 wt % or less, based on the total weight of the puncture sealing agent.

This solution bases on the surprising finding that by combining in a puncture sealing agent a solid content derived from natural rubber latex of 21 wt % or less, based on 100 wt % of the puncture sealing agent, an aqueous solution of a carbohydrate as an adhesive and an antifreezing agent, a puncture sealing agent can be obtained which is at least primarily based on natural components and therefor resource saving and environmentally friendly. It was found that such a puncture sealing agent provides excellent sealing performance, injectability and injectability in low-temperature environments. In addition, by using carbohydrates as adhesives, it is possible to significantly reduce the costs for the puncture sealing agent, since the use of synthetic resins can be reduced or completely avoided. Accordingly, it is possible to reduce or even avoid the use of dangerous compounds and additives. Moreover, disposal of the puncture sealing agent according to the invention after expiry is easy and non-dangerous.

Another aspect of the present invention is a puncture repair system comprising a puncture sealing agent according to the present invention.

The present invention concerns also a method of producing a puncture sealing agent by mixing natural rubber latex, an aqueous solution of an adhesive and an antifreezing agent, wherein the adhesive is a carbohydrate and the puncture sealing agent comprises a solid content resulting from the natural rubber latex in an amount of 21 wt % or less, based on the total weight of the puncture sealing agent.

Preferred embodiments of the present invention are the subject-matter of dependent claims and described subsequently along with further preferred embodiments which are not expressly mentioned in the dependent claims.

DESCRIPTION OF EMBODIMENTS

Preferably, the puncture sealing agent comprises, based on 100 wt % of the puncture sealing agent, an amount of natural rubber latex, such that the solid content in the puncture sealing agent which is derived from the natural rubber latex is 19 wt % or less and even more preferably 17 wt % or less. It is also preferable that the puncture sealing agent comprises, based on 100 wt % of the puncture sealing agent, an amount of natural rubber latex, such that the solid content in the puncture sealing agent which is derived from the natural rubber latex is 9 wt % or more, more preferably 11 wt % or more, even more preferably 12 wt % or more and most preferably 14 wt % or more. It is to be understood that the amount of solid content derived from natural rubber latex in the puncture sealing agent is, based on 100 wt % of the puncture sealing agent, preferably in the range of 9 wt % to 21 wt %, more preferably in the range of 11 wt % to 19 wt %, even more preferably in the range of 12 wt % to 17 wt % and even more preferably in the range of 14 to 17 wt %. However, also ranges of 9 wt % to 19 wt %, 11 wt % to 21 wt %, 14 wt % to 19 wt % as well as other ranges resulting from other combinations of the upper and lower limits mentioned above constitute preferred embodiments of the present invention. With the solid content derived from the natural rubber latex being included in the puncture sealing agent as described, the effects of the present invention can better be achieved. With this regard it is further preferable that in the puncture sealant agent the complete solid content derived from polymeric materials other than the dissolved carbohydrate in the aqueous solution of the adhesive and from polymeric surfactants is substantially identical to the solid content derived from the natural rubber latex.

Preferably, in the puncture sealing agent the solid content in the natural rubber latex is from 40 to 80 parts by mass, more preferably the solid content in the natural rubber latex is in the range of from 50 to 70 parts by mass and even more preferably in the range of from 55 to 60 parts by mass, based on 100 parts by mass of the natural rubber latex. With a solid content in the range of 40 to 80 parts by mass, a good balance between sealant performance and storage performance can be obtained.

Preferably, based on 100 wt % of the puncture sealing agent, the amount of natural rubber latex is 15 wt % or more, more preferably 18 wt % or more and even more preferably 20 wt % or more. If less than 15 wt % of natural rubber latex is contained in the puncture sealing agent, there is a risk that sealing of the puncture in the tire is insufficient or too slow and that the sealant performance is deteriorated. It is also preferable that, based on 100 wt % of the puncture sealing agent, the amount of natural rubber latex is 35 wt % or less, further preferably 32 wt % or less, more preferably 29 wt % or less and even more preferably 28 wt % or less. With the amount of natural rubber latex being 35 wt % or less, preferable injectability and storage performance as well as injectability in low-temperature environments can be obtained. It is to be understood that the amount of natural rubber latex in the puncture sealing agent is, based on 100 wt % of the puncture sealing agent, preferably in the range of 15 wt % to 35 wt %, more preferably in the range of 18 wt % to 32 wt %, even more preferably in the range of 20 wt % to 29 wt % and even more preferably in the range of 20 to 27 wt %. However, also ranges of 15 wt % to 27 wt %, 20 wt % to 32 wt %, 18 wt % to 27 wt % as well as other ranges resulting from other combinations of the upper and lower limits mentioned above constitute preferred embodiments of the present invention.

With the amount of natural rubber latex being in said ranges, the above mentioned effects can be advantageously achieved.

The natural rubber used in the present invention is not particularly limited, and conventional natural rubber latex can be used. Specific examples of the natural rubber latex include the ones obtained from Hevea brasiliensis by tapping, and so-called "deproteinized natural rubber latex", which is a protein-free natural rubber latex.

In the puncture sealing agent according to the invention it is preferable that, based on the total weight, i.e. 100 wt %, of the puncture sealing agent, the puncture sealing agent comprises the antifreezing agent in an amount of 30 wt % or more, more preferably in an amount of 33 wt % or more, even more preferably in an amount of 35 wt % or more and most preferably in an amount of 40 wt % or more. The upper limit of the amount is not particularly limited, but is preferably 70 wt % or less, more preferably 60 wt % or less and even more preferably 50 wt % or less.

Preferably, the antifreezing agent is at least one selected from the group consisting of glycerol, propylene glycol, ethylene glycol and propane-1,3-diol. These can be used as mixtures. However, it is even more preferred that the puncture sealing agent comprises only one of glycerol, propylene glycol, ethylene glycol or propane-1,3-diol as antifreezing agent and it is most preferred that the antifreezing agent consists of one of glycerol, propylene glycol, ethylene glycol or propane-1,3-diol in the above mentioned amount.

From an ecological point of view, it is preferred that in the puncture sealing agent the natural rubber latex, the aqueous solution of the adhesive and the antifreezing agent are natural components. With this regard, it is even more preferred that the combined content of all natural components of the puncture sealing agent is equal to or greater than 90 wt % based on the total mass of the puncture sealing agent. Most preferably, the puncture sealing agent is free from any synthetic resins. The low content or preferably absence of synthetic resin in the puncture sealing agent allows for a resource saving and environmentally friendly puncture sealing agent which can be easily disposed after expiry. It was also found that with a puncture sealing agent free of synthetic resins, excellent low temperature properties and excellent seal retention is obtained. In the context of this application, the term natural component refers to compounds and derivatives of compounds that can be found in nature and are not petroleum derived, i.e. compounds that can be found in nature but which have been modified for example by a chemical reaction. Usually, synthetic resins are petroleum derived resins.

Preferably, the amount of synthetic resins in the puncture sealing agent is 5 wt % or less, more preferably 3 wt % or less, even more preferably 1 wt % or less, particularly preferably 0.1 wt % or less, most preferably 0 wt o, based on the total weight of the puncture sealing agent.

Concerning the adhesive, it is preferable that the puncture sealing agent comprises 10 to 30 wt % of the aqueous solution of the adhesive, based on the total weight of the puncture sealing agent. Such an amount of the aqueous solution of the adhesives allows that the puncture sealing agent has a good injectability and sealing performance. The upper limit of the amount is more preferably 20 wt % or less.

With this regard it is also preferable that in the aqueous solution of the adhesive the mass ratio ($Z_a:Z_b$) of mass of carbohydrate, preferably dissolved carbohydrate, ($Z_a$) to mass of solvent ($Z_b$) is in the range of from 90:10 to 50:50, more preferably in the range of from 80:20 to 55:40, even more preferably in the range of from 70:30 to 60:40 and particularly preferably in the range of from 68:32 to 60:40. If the ratio is greater than 90:10, there is a risk that the viscosity of the aqueous solution of the adhesive is increased and that the injectability is deteriorated. However, if the ratio is below 50:50, the time for sealing a puncture may increase and the sealing performance may be deteriorated.

It is preferable that the amount of carbohydrate in the puncture sealing agent, based on 100 wt % of the puncture sealing agent, is 1.0 wt % or more, more preferably 2.0 wt % or more, even more preferably 3.0 wt % or more, even more preferably 4.0 wt % or more, even more preferably 4.4 wt % or more, further preferably 5.0 wt % or more, particularly preferably 5.5 wt % or more and most preferably 6.0 wt % or more. It is also preferable that the amount is 10.0 wt % or less, more preferably 9.0 wt % or less, even more preferably 8.0 wt % or less.

In the puncture sealing agent the carbohydrate is preferably a monosaccharide, an oligosaccharide, a polysaccharide or a mixture thereof. Oligosaccharides are di- to decasaccharides, preferably di- to pentasaccharides. It is preferable that the carbohydrate is at least one selected from the group consisting of sugars, starches, degraded starches and mixtures thereof, even more preferably from the group consisting of sugars, degraded starches and mixtures thereof. Particularly preferably the carbohydrate is sucrose, glucose, fructose or a mixture thereof, and is most preferably sucrose.

In accordance with an even more preferred embodiment of the present invention, the carbohydrate is a monosaccharide, an oligosaccharide or a mixture thereof. The monosaccharide may be a triose, tetrose, pentose, hexose, heptose or a mixture thereof, with hexoses, pentoses and mixtures thereof being particularly preferred. Some specific examples for monosaccharides are glycerinaldehyde, dihydroxyacetone, erythrose, threose, erythrulose, ribose, arabinose, xylose, lyxose, ribulose, xylulose, allose, altrose, glucose, mannose, culose, idose, galactose, talose, psicose, fructose, fuculose, sorbose, tagatose, sedoheptulose, mannoheptulose, taloheptulose, alloheptulose, glucoheptose and mannoheptose. Among these monosaccharides mannose, fructose, glucose and mixtures thereof are preferred. Some specific examples for disaccharides include sucrose, lactulose, lactose, maltose, trehalose, cellobiose, chitobiose, kojibiose, nigerose, isomaltose, β,β-trehalose, α,β-trehalose, sophorose, laminaribiose, gentiobiose, turanose, maltulose, palatinose, gentiobiulose, mannobiose, melibiose, melibiulose, rutinose, rutinulose and xylobiose. Among these disaccharides sucrose, lactose, maltose and mixtures thereof are preferred.

Hydrolysates of starch, for example glucose syrup and/or glucose-fructose syrup or dextrin are preferably used as adhesive, since when using these, the costs for the puncture sealing agent are reduced. Dextrin, glucose syrup and glucose-fructose syrup are liquid starch hydrolysates including mono-, di-, and oligosaccharides and can be made from any source of starch, for example from wheat, tapioca and potatoes. Most preferably, the carbohydrate used as an adhesive is sucrose, glucose, fructose or a mixture of two or more of these. The use of sucrose is particularly preferred under the aspect of storage stability.

In the puncture sealing agent according to the present invention, the carbohydrate is included in the form of an aqueous solution, i.e. the carbohydrate is dissolved. To avoid precipitation of the carbohydrate in the puncture sealing agent, it is preferable that the carbohydrate has a water solubility at 20° C. of 100 g/L or more, more preferably of 300 g/L or more.

It is highly preferable that the puncture sealing agent according to the invention comprises at least one selected from the group consisting of sucrose, glucose, fructose and mixtures of two or more of these carbohydrates. Most preferably, the carbohydrate is sucrose.

It is preferred that the puncture sealing agent comprises a surfactant, particularly preferably, the amount of surfactant is equal to or less than 0.5 wt % and even more preferably equal to or less than 0.3 wt % based on the total weight of the puncture sealing agent. The lower limit of the amount is not particularly limited, but is preferably 0.1 wt % or more, more preferably 0.2 wt % or more. The surfactant improves the storage stability of the puncture sealing agent, since it prevents unwanted coagulation of rubber particles during storage. If more than 0.5 wt % surfactant is used, there is the risk that the sealing performance is deteriorated.

It is particularly preferred that the surfactant is a natural compound, i.e. not petroleum based. If the surfactant is a natural compound, the puncture sealing agent is resource saving and environmentally friendly. Natural surfactants can be anionic surfactants, amphoteric surfactants, cationic surfactants, non-ionic surfactants or mixtures thereof. Most preferably, the natural surfactant comprises at least one non-ionic surfactant.

Anionic surfactants have a negatively charged hydrophilic head and examples of anionic surfactants are sodium sulfates, ammonium sulfates, sulfosuccinates, sarcosines, sarcosinates, isethionates, taurates, alkylbenzene sulfonates, alkyl phosphates, and alkenyl succinates. Amphoteric surfactants have either a positive or negative charge, depending on the pH of the medium. Some examples for amphoteric surfactants are coco betaine, lauryl betaine, hydroxysultaines, alkyl dimethyl betaine and alkyl amide betaine. Cationic surfactants present a positively charged head at the hydrophilic part. Examples for cationic surfactants include chlorides of benzalkonium, stearalkonium, centrimonium and trimethyl ammonium compounds, methyl sulfates, alkylamine acetates, and quaternary ammonium salts. Nonionic surfactants have no ionic charge in their hydrophilic units. Some examples for nonionic surfactants include ethoxylated oxides, wax, emulsifying wax, glyceryl oleate, glyceryl stearate, PEGylated compounds such as ceteareths and sorbitans, lauryl glucoside, polyglycose, polyoxyethylene alcohol ethers, polyoxyethylene fatty acid esters, polyoxyethylenen alkylphenols, and polyoxyethylene-polyoxypropylene block polymers.

It is noted that the above described features of the puncture sealing agent can of course be combined with each other to give preferred embodiments of the invention. Accordingly, in preferred embodiments of the invention, the compounds and the value ranges for the compounds described above are independently chosen and combined with each other. This results in a large number of possible embodiments representing the invention, only a few of which are explicitly mentioned. The skilled person understands that it is possible to combine the subsequently mentioned preferred embodiments with each other and with the features described above.

Accordingly, one preferred exemplary embodiment of the puncture sealing agent, based on the total weight of the puncture sealing agent, comprises 15 to 35 wt % of natural rubber latex, 10 to 30 wt % of an aqueous solution of an adhesive and 30 wt % or more of an antifreezing agent, wherein the natural rubber latex has a solid content of 40 to 80 parts by mass, based on 100 parts by mass of the natural rubber latex.

In another preferred exemplary embodiment, the adhesive is selected from the group consisting of sucrose, glucose, fructose and mixtures of two or more of these carbohydrates and the antifreezing agent is at least one selected from the group consisting of glycerol, propylene glycol, ethylene glycol, propane-1,3-diol and mixtures thereof.

According to a further preferred exemplary embodiment, the puncture sealing agent comprises, based on 100 wt % of the puncture sealing agent, natural rubber latex in an amount, such that the solid content in the puncture sealing agent which is derived from the natural rubber latex is 21 wt % or less, and a surfactant.

According to a further preferred exemplary embodiment, in the puncture sealing agent, based on 100 wt % of the puncture sealing agent, the amount of natural rubber latex is such that in the puncture sealing agent the solid content derived from natural rubber latex is 19 wt % or less, and, also based on 100 wt % of the puncture sealing agent, the amount of carbohydrate is 4.4 wt % or more, wherein it is even more preferable that the carbohydrate is a monosaccharide, an oligosaccharide, a polysaccharide or a mixture thereof, further preferably, the carbohydrate is at least one selected from the group consisting of sugars, degraded starches and mixtures thereof.

In another preferred exemplary embodiment, in the puncture sealing agent, based on 100 wt % of the puncture sealing agent, the amount of carbohydrate is 6.0 wt % or more and the carbohydrate is an oligosaccharide, in particular a disaccharide, for example sucrose.

According to a further preferred exemplary embodiment, the puncture sealing agent comprises, based on 100 wt % of the puncture sealing agent, natural rubber latex in an amount, such that the solid content in the puncture sealing agent which is derived from the natural rubber latex is in the range of 9 to 19 wt %, and the carbohydrate is at least one having a solubility in water of 100 g/L at a temperature of 20° C.

In a further preferred exemplary embodiment, the puncture sealing agent comprises the antifreezing agent, based on 100 wt % of the puncture sealing agent, in an amount of 33 wt % or more, wherein the antifreezing agent is at least one of ethylene glycol, propylene glycol, propane-1,3-diol or glycerol, and wherein the carbohydrate is at least one of sucrose, fructose or dextrin.

The puncture repair system preferably comprises a container for storing the puncture sealing agent of the present invention and a compressor for filling a tire with air.

EXAMPLES

Subsequently, the present invention is described by means of examples, which do, however, not limit the present patent application.

Preparation of Examples 1 to 8 and of Comparative Examples 1 and 2

For preparing the puncture sealing agents according to Examples 1 to 8 and of Comparative Examples 1 and 2 the components indicated in Table 1 below were mixed at the proportions listed in Table 1 under vigorous stirring.

The components used in the preparation of the examples and comparative examples are described below:
Natural rubber latex: HA Latex, solid content: 60 mass %, obtained from Centrotrade Minerals & Metals, Inc
Tackifier 1: An aqueous dispersion of resin containing resin acids, rosin acids, and potassium salts (solid content: 40 mass %, Aquatac™ dispersion produced by Kraton Corporation)
Tackifier 2: Ethylene vinyl acetate copolymer dispersion (solid content: 40 mass %, produced by Porex corporation).
Carbohydrates: sucrose, fructose and dextrin were obtained from Sigma-Aldrich.
Solution of adhesive A: a solution of sucrose in water in a concentration of 60 g sucrose in 30 g water was prepared under vigorous stirring.
Solution of adhesive B: a solution of fructose in water in a concentration of 50 g fructose in 50 g water was prepared under vigorous stirring.
Solution of adhesive C: a solution of dextrin in water in a concentration of 50 g dextrin in 50 g water was prepared under vigorous stirring.
Solution of adhesive D: a solution of sucrose in water in a concentration of 50 g sucrose in 50 g water was prepared under vigorous stirring.
Solution of adhesive E: a solution of sucrose in water in a concentration of 70 g sucrose in 30 g water was prepared under vigorous stirring.
Surfactant: Emulgen 420 manufactured by Kao Corporation
Antifreezing agents: ethylene glycol, propylene glycol, propane-1,3-diol and glycerol have been purchased from Sigma-Aldrich.

The viscosity was measured in accordance with DIN EN ISO 2555. The density of the puncture sealants was measured in accordance with DIN 51757 at room temperature.

Results of the viscosity measurement at 20° C., −30° C. and −40° C. and of the density measurement are summarized in Table 2. At room temperature, the puncture sealant agents according to the invention have viscosities and densities similar to that of the puncture sealant according to Comparative Example 1. However, at −40° C. the puncture sealant agent according to Comparative Example 1 is not liquid.

In order to check the injectability of the tire puncture sealing agents of Examples 1 to 8 and of Comparative Examples 1 and 2, the content of a 450 mL bottle filled with a tire puncture sealing agent was pumped through a tire valve with the help of a 15 A compressor into a 36 L container to check if the material can be injected trough the tire valve without clogging the tire valve. The ΔPump-values listed in Table 3 represent the differences in pressure between the pressure observed on the side of the 450 mL bottle and the pressure observed on the side of the 36 L container. A smaller value indicates that the material can be better injected. The values listed in Table 3 correspond to the pressure difference measured after 5 minutes at the different temperatures indicated in Table 3.

The road tests were performed using 205/55 R16 Falken Ziex 914 tires. A puncture hole having a diameter of 6 mm was made in the shoulder groove portion of the tread of a tire. Next, 450 mL of the puncture sealing agent was injected via the tire valve and the tire was filled with the aid of a compressor until a pressure of 2.5 bar was reached. The tire was then subjected to intermittent driving. The tire was driven for 5 minutes at a speed of no more than 50 Km/h and then controlled. The intermittent driving test was repeatedly carried out until there was no more air leakage from the tire, i.e. no bubbling effect observed after spraying water in the vicinity of the puncture hole. Then, the puncture sealing performance was determined based on the time required until no bubbling effect was observed after spraying water, while the loss-of-air performance was determined based on the time required for the tire pressure to equal or exceed the previous tire pressure measurement when it was measured every 5 minutes.

The puncture sealing performance and loss-of-air performance were evaluated in both summer and winter times. The results are shown in Table 3 and evaluation was carried out on a scale of AA to C, wherein the marks have the meanings explained below. It is noted that AA is the best mark, A is better than B and B is better than C:
"AA": successfully accomplished after no more than 5 minutes.
"A": successfully accomplished after more than 5 minutes and not more than 10 minutes.
"B": successfully accomplished after more than 10 minutes and not more than 15 minutes.
"C": successfully accomplished after more than 15 minutes and not more than 30 minutes.

The puncture sealant agents evaluated with the mark "AA" in loss of air—see Table 3—and the sealant agents according to Comparative Examples 1 and 2 were tested by means of seal retention. Accordingly, to test the long-term performance of the puncture sealing agent, a seal retention test was carried out during summer, after the above-mentioned driving test. Evaluation of the same is also represented in Table 3. The puncture sealant agents of Examples 1, 6, 7, and 8 and of Comparative Examples 1 and 2 were injected in damaged tires (205/55 R16 Falken Ziex 914 with a puncture hole having a diameter of 6 mm in the shoulder groove portion of the tread) and a 300 Km driving test was performed. As shown in Table 3, when the puncture sealing agents of Examples 1, 6, 7, and 8 were used, no air leakage was observed after driving 100 Km/h for 300 Km, which indicates a tire with a tightly sealed puncture and the seal retention was evaluated with +. A certain degree of air leakage was observed when the puncture sealing agents of Comparative Examples 1 and 2 were used, and the seal retention was evaluated with +/−.

The results were fully satisfactory for the puncture sealing agents according to Examples 1, 6, 7, and 8.

To test the storage properties, accelerated stability tests were performed causing the true state of the dispersion to change or at least to be stressed. The aging experiments were carried out in accordance with ISO TR 13097. In this particular case, the prepared puncture sealing agent samples were allowed to stand for 15 days at a temperature of 70° C. Creaming phenomenon was determined in accordance with ISO 13318-2 on a four-point scale: L (remained liquid), SC (changed to slightly creamy), C (changed to be creamy), and S (solidified). The results are summarized in Table 3.

Comparative Examples 1 and 2 demonstrate further that replacing a synthetic resin, such as ethylene vinyl acetate copolymer dispersion, by a natural resin, such as the one used as tackifier in Comparative Example 1, neither improves the seal retention and can result in a puncture sealing agent being not liquid at −40° C.

TABLE 1

| | Amount of component (wt %) | | | | | | | | | |
|---|---|---|---|---|---|---|---|---|---|---|
| | Comp. Ex. 1 | Comp. Ex. 2 | Ex. 1 | Ex. 2 | Ex. 3 | Ex. 4 | Ex. 5 | Ex. 6 | Ex. 7 | Ex. 8 |
| Natural rubber latex | 25 | 25 | 25 | 25 | 25 | 25 | 25 | 25 | 25 | 25 |
| Water | 18.6 | 18.6 | 18.6 | 18.6 | 18.6 | 18.6 | 18.6 | 18.6 | 18.6 | 18.6 |
| Tackifier 1 | 11 | | | | | | | | | |
| Tackifier 2 | | 11 | | | | | | | | |
| Solution of adhesive A | | | 11 | | | | | 11 | 11 | 11 |
| Solution of adhesive B | | | | 11 | | | | | | |
| Solution of adhesive C | | | | | 11 | | | | | |
| Solution of adhesive D | | | | | | 11 | | | | |
| Solution of adhesive E | | | | | | | 11 | | | |
| Surfactant | 0.4 | 0.4 | 0.4 | 0.4 | 0.4 | 0.4 | 0.4 | 0.4 | 0.4 | 0.4 |
| Ethylene glycol | 45 | 45 | 45 | 45 | 45 | 45 | 45 | | | |
| Propylene glycol | | | | | | | | | | 45 |
| Ppropane-1,3-diol | | | | | | | | | 45 | |
| Glycerol | | | | | | | | 45 | | |

Ex.: Example
Comp. Ex.: Comparative Example

TABLE 2

| | | Density (g/mL) | Viscosity at 20° C. (mPa · s) | Viscosity at −30° C. (mPa · s) | Viscosity at −40° C. (mPa · s) |
|---|---|---|---|---|---|
| Physical Properties | Comp. Ex. 1 | 1.018 | 21 | <100 | Not liquid |
| | Ex. 1 | 1.022 | 22 | <100 | <1500 |
| | Ex. 2 | 1.037 | 36 | | |
| | Ex. 3 | 1.029 | 35 | | |
| | Ex. 4 | 1.021 | 21 | | |
| | Ex. 5 | 1.039 | 33 | | |
| | Ex. 6 | 1.027 | 25 | <100 | <1500 |
| | Ex. 7 | 1.016 | 23 | <100 | <1500 |
| | Ex. 8 | 1.016 | 22 | <100 | <1500 |

TABLE 3

| | Performance | | | | | | |
|---|---|---|---|---|---|---|---|
| | Injectability: ΔPump (bar) | | | Road test | | Seal Retention (Summer) | Aging Storage properties |
| | T = −40° C. | T = +25° C. | T = +70° C. | Puncture Sealing: Summer/ Winter | Loss of Air: Summer/ Winter | | |
| Comp. Ex. 1 | Not liquid | 0.10 | 0.12 | A/n.a. | A⁻/n.a. | +/− | SC |
| Comp. Ex. 2 | 0.29 | 0.10 | 0.12 | A/A | A⁻/B | +/− | L |
| Ex. 1 | 0.30 | 0.10 | 0.12 | A/A | AA/AA | + | L |
| Ex. 2 | 0.31 | 0.12 | 0.14 | B/B | B/B⁻ | | SC |
| Ex. 3 | 0.31 | 0.14 | 0.15 | B/B⁻ | B/B | | C |
| Ex. 4 | 0.34 | 0.11 | 0.12 | B/B⁺ | B⁺/B⁺ | | L |

TABLE 3-continued

| | Performance | | | | | | |
|---|---|---|---|---|---|---|---|
| | | | | | | | |
| | | | | Road test | | | |
| | Injectability: ΔPump (bar) | | | Puncture Sealing: Summer/ | Loss of Air: Summer/ | Seal Retention | Aging Storage |
| | T = −40° C. | T = +25° C. | T = +70° C. | Winter | Winter | (Summer) | properties |
| Ex. 5 | 0.31 | 0.13 | 0.22 | A/B+ | A/A | | SC |
| Ex. 6 | 0.32 | 0.11 | 0.16 | A/A | AA/AA | + | L |
| Ex. 7 | 0.32 | 0.10 | 0.15 | A/A | AA/AA | + | L |
| Ex. 8 | 0.33 | 0.10 | 0.15 | A/A | AA/AA | + | L |

The invention claimed is:

1. A puncture sealing agent, comprising: natural rubber latex, an aqueous solution of an adhesive and an antifreezing agent,
the adhesive being a carbohydrate,
the puncture sealing agent comprising a solid content resulting from the natural rubber latex in an amount of 21 wt % or less, based on the total weight of the puncture sealing agent.

2. The puncture sealing agent according to claim 1, wherein the solid content resulting from the natural rubber latex is 19 wt % or less, based on the total weight of the puncture sealing agent.

3. The puncture sealing agent according to claim 1, wherein the solid content resulting from the natural rubber latex is 9 wt % or more, based on the total weight of the puncture sealing agent.

4. The puncture sealing agent according to claim 1, wherein the puncture sealing agent comprises 30 wt % or more of the anti-freezing agent, based on the total weight of the puncture sealing agent.

5. The puncture sealing agent according to claim 1, wherein the antifreezing agent is at least one selected from the group consisting of glycerol, propylene glycol, ethylene glycol and propane-1,3-diol.

6. The puncture sealing agent according to claim 1, wherein the natural rubber latex, the aqueous solution of the adhesive and the antifreezing agent are natural components.

7. The puncture sealing agent according to claim 1, wherein the combined content of all natural components of the puncture sealing agent is equal to or greater than 90 wt % based on the total mass of the puncture sealing agent.

8. The puncture sealing agent according to claim 1, wherein the puncture sealing agent comprises 10 to 30 wt % of the aqueous solution of the adhesive, based on the total weight of the puncture sealing agent.

9. The puncture sealing agent according to claim 1, wherein the amount of carbohydrate in the puncture sealing agent is 1.0 wt % or more, based on the total weight of the puncture sealing agent.

10. The puncture sealing agent according to claim 1, wherein in the aqueous solution of the adhesive, the mass ratio ($Z_a$:$Z_b$) of mass of dissolved carbohydrate ($Z_a$) to mass of solvent ($Z_b$) is in the range of from 90:10 to 50:50.

11. The puncture sealing agent according to claim 1, wherein the puncture sealing agent comprises 9 to 19 wt % solid content derived from the natural rubber latex, 10 to 30 wt % of the aqueous solution of the adhesive and 30 wt % or more of the antifreezing agent, all based on the total weight of the puncture sealing agent.

12. The puncture sealing agent according to claim 1, wherein the carbohydrate is at least one selected from the group consisting of sugars, starches, degraded starches and mixtures thereof.

13. The puncture sealing agent according to claim 1, wherein the puncture sealing agent comprises a surfactant.

14. The puncture sealing agent according to claim 1, wherein the solid content in the natural rubber latex is from 40 to 80 parts by mass, based on 100 parts by mass of the natural rubber latex.

15. A puncture repair system, comprising the puncture sealing agent according to claim 1.

* * * * *